United States Patent
Hosotani et al.

(10) Patent No.: US 8,523,242 B2
(45) Date of Patent: Sep. 3, 2013

(54) CONNECTION-STRUCTURE OF A FLEXIBLE TUBE

(75) Inventors: Satoru Hosotani, Nabari (JP); Yoshinari Rokken, Nabari (JP); Jun Okada, Toyota (JP); Takeshi Amano, Toyota (JP)

(73) Assignees: Nitta Corporation, Osaka-Shi (JP); FTS Co., Ltd., Toyota-Shi (JP)

( * ) Notice: Subject to any disclaimer, the term of this patent is extended or adjusted under 35 U.S.C. 154(b) by 0 days.

(21) Appl. No.: 13/403,954

(22) Filed: Feb. 23, 2012

(65) Prior Publication Data

US 2012/0217740 A1 Aug. 30, 2012

(30) Foreign Application Priority Data

Feb. 24, 2011 (JP) .................................. 2011-038414

(51) Int. Cl.
*F16L 33/00* (2006.01)
(52) U.S. Cl.
USPC .......................................................... 285/239
(58) Field of Classification Search
USPC .................................................. 285/239, 242
See application file for complete search history.

(56) References Cited

U.S. PATENT DOCUMENTS

| | | | |
|---|---|---|---|
| 3,759,554 A | | 9/1973 | Carter |
| 4,733,890 A | * | 3/1988 | Vyse ............................. 285/256 |
| 5,135,268 A | * | 8/1992 | McNaughton et al. ........ 285/239 |
| 5,261,709 A | * | 11/1993 | McNaughton et al. ........ 285/239 |
| 5,779,286 A | * | 7/1998 | Kaishio ........................... 285/319 |
| 7,150,478 B2 | * | 12/2006 | Poirier et al. .................. 285/347 |
| 7,434,845 B2 | * | 10/2008 | Ogiso et al. .................... 285/239 |
| 7,735,877 B2 | | 6/2010 | Ito et al. |

FOREIGN PATENT DOCUMENTS

| | | |
|---|---|---|
| EP | 1612466 | 1/2006 |
| EP | 1818592 | 8/2007 |
| JP | 2006-090416 | 4/2006 |

OTHER PUBLICATIONS

Extended European Search Report for corresponding EP Application No. 12156658.2-2424, Jun. 4, 2012.

* cited by examiner

*Primary Examiner* — David E Bochna
(74) *Attorney, Agent, or Firm* — Ditthavong Mori & Steiner, P.C.

(57) ABSTRACT

A connection-structure of a flexible tube, in which the flexible tube is fitted to an end portion of a metal pipe, comprises an annular projection, a first radially enlarged portion, a seal ring and a second radially enlarged portion. The annular projection is formed on an outer surface of the end portion of the metal pipe. The first radially enlarged portion is formed on the tip side of the metal pipe relative to the projection, defining a first annular groove with the projection. The seal ring is fitted into the annular groove. The second enlarged portion is formed on the base side of the metal pipe relative to the projection, defining a second annular groove with the projection. The tip portion of the flexible tube is positioned close to the maximum diameter portion of the second enlarged portion.

10 Claims, 3 Drawing Sheets

CONNECTION-STRUCTURE OF A FLEXIBLE TUBE

BACKGROUND OF THE INVENTION

1. Field of the Invention

The present invention relates to a structure for connecting a flexible or resin tube to an end portion of a metal pipe.

2. Description of the Related Art

Conventionally, there is known a connection-structure as disclosed in Japanese Unexamined Patent Publication No. 2006-090416. In this connection-structure, an end portion of the metal pipe is provided with at least two radially enlarged portions, and a seal ring is positioned in an annular groove formed between the radially enlarged portions. A flexible tube is fitted to the metal pipe such that the tip portion of the flexible tube passes over the two radially enlarged portions.

In the conventional structure, however, the tip portion of the flexible tube tends to expand because of an operation in which the flexible tube is connected to the metal pipe, so that a gap is formed between the flexible tube and the metal pipe, increasing the possibility for water or dust to accumulate in the gap. Due to this, the metal pipe rusts easily, and therefore, it is necessary to use material for the metal pipe that is resistant to rust, such as stainless steel, or to carry out an operation in which an outer surface of the metal pipe is painted, and so on.

SUMMARY OF THE INVENTION

Therefore, an object of the present invention is to improve the tightness of the fitting between the flexible tube and the metal pipe, so that it becomes hard for water or dust to enter between the flexible tube and the metal pipe.

According to the present invention, there is provided a connection-structure of a flexible tube, in which the flexible tube is tightly fitted to an outer surface of an end portion of a metal pipe. The connection-structure of the flexible tube comprises an annular projection, a first radially enlarged portion, a seal ring, and a second radially enlarged portion. The annular projection is formed on the outer surface of the end portion of the metal pipe, and circumferentially extends over the whole circumference of the metal pipe. The first radially enlarged portion is formed on the tip side of the metal pipe relative to the annular projection, and defines a first annular groove with the annular projection. The seal ring is fitted into the first annular groove. The second radially enlarged portion is formed on the base side of the metal pipe relative to the annular projection, and defines a second annular groove with the annular projection. The tip portion of the flexible tube is positioned close to the maximum diameter portion of the second radially enlarged portion.

BRIEF DESCRIPTION OF THE DRAWINGS

The object and advantages of the present invention will be better understood from the following description, with reference to the accompanying drawings in which.

DESCRIPTION OF THE PREFERRED EMBODIMENTS

Figure 1:
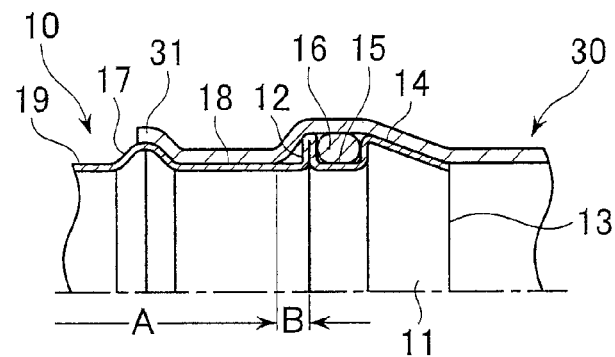
FIG. 1 is a cutaway side view showing an upper-half section of a connection-structure of a flexible tube of a first embodiment of the present invention.

The present invention is described below with reference to the embodiments shown in the drawings. Each embodiment is a connection-structure of a flexible tube and a metal pipe, utilized in a fuel filler pipe for an automobile, through which fuel is channeled from a fuel filler opening to a fuel tank.

FIG. 1 shows a first embodiment, in which a metal pipe 10 horizontally extends from the left side such that an opening 11 faces the right side. A flexible or resin tube 30 horizontally extends from the right side, and is tightly fitted to an outer surface of an end portion of the metal pipe 10.

An annular projection 12 is formed on the outer surface of the end portion of the metal pipe 10. The annular projection 12 circumferentially extends over the whole circumference of the metal pipe 10. In the embodiment, the annular projection 12 is formed using a spool processing technique. A first radially enlarged portion 14 is formed on a portion closer to the tip 13 of the metal pipe 10 relative to the annular projection 12. The first radially enlarged portion 14 extends parallel to the annular projection 12 to define a first annular groove 15 with the annular projection 12. The first annular groove 15 has the shape of an outward-facing open channel, in which a seal ring 16 is fitted. The seal ring 16 is an O-ring, and is made of fluorocarbon polymers, for example.

A second radially enlarged portion 17 is formed on the base side (i.e., a portion opposite to the tip 13) of the metal pipe 10 relative to the annular projection 12. The second radially enlarged portion 17 extends parallel to the annular projection 12 to define a second annular groove 18 with the annular projection 12. The second annular groove 18 has a greater breadth than that of the first annular groove 15, and a seal ring is not provided.

The first radially enlarged portion 14 is formed using a bulging technique, and the second radially enlarged portion 17 is formed using a spool processing technique. The second radially enlarged portion 17 is bulged in comparison with portions adjacent thereto.

The diameter of the outer surface of the metal pipe 10 on the opposite side of the second annular groove 18 with respect to the second radially enlarged portion 23 is substantially the same as that of the second annular groove 18.

Figure 2:
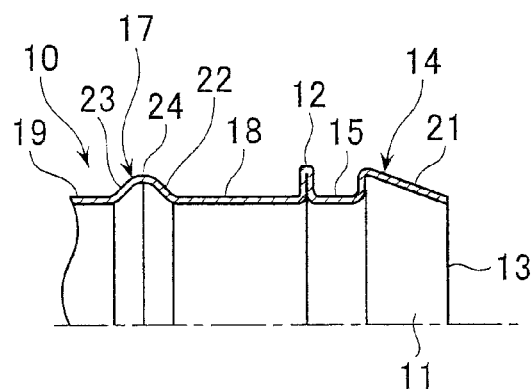
FIG. 2 is a cutaway side view showing an upper-half section of the metal pipe of the first embodiment.

As shown in FIG. 2, an outer surface of the first radially enlarged portion 14 is a first tapered surface 21 of which the diameter becomes smaller as the distance to the tip portion of the metal pipe 10 decreases. An outer surface on the side of the second radially enlarged portion 17 nearest to the second annular groove 18 is a second tapered surface 22 of which the diameter becomes smaller as the distance to the second annular groove 18 decreases. An outer surface of the second radially enlarged portion 17 that is on the opposite side to the second tapered surface 22 is a third tapered surface 23 that is inclined in the opposite direction of the second tapered surface 22. The inclination angles of the second and third tapered surfaces 22, 23 are substantially the same, and are steeper than the first tapered surface 21.

The maximum diameters of the annular projection 12, and the first and second radially enlarged portions 14, 17 are substantially identical, and are slightly less than the outer diameter of the seal ring 16 fitted into the first annular groove 15.

The flexible tube 30 is made of polyamide resin, fluoroplastics, olefin resin, and so on, and the inside diameter of the flexible tube 30 is slightly less than the outside diameter of the metal pipe 10. Therefore, in a state in which the flexible tube 30 is press-fitted to the metal pipe 10, the flexible tube 30 is in tight contact with the metal pipe 10 in a liquid-proof manner. That is, an inner surface of the flexible tube 30 is hermetic or in tight contact with the first tapered surface 21 of the first radially enlarged portion 14, the seal ring 16, the second annular groove 18, the second tapered surface 22 of the second radially enlarged portion 17, and a part of the third tapered surface 23. The tip portion 31 of the flexible tube 30 is positioned close to the maximum diameter portion of the second radially enlarged portion 17, and reaches an edge of the third tapered portion 23, passing over the second tapered surface 22. The amount by which the tip portion 31 of the flexible tube 30 protrudes from the peak of the second radially enlarged portion 17, i.e., the boundary between the second tapered surface 22 and the third tapered surface 23, to the third tapered surface 23, is 0.5-5.0 mm.

An outer surface of the metal pipe 10 is painted for rust-prevention, but because the flexible tube 30 is tightly fitted to the end portion of the metal pipe 10, the painted portion of the metal pipe 10 can be reduced. More concretely, on the outer surface of the metal pipe 10 a portion (A) up to the second annular groove 18, to which the tip portion of the flexible tube 30 is fitted tightly, should be painted. A portion (B) of the second annular groove 18, where the flexible tube 30 is separated from a surface of the groove 18, i.e., a part close to the annular projection 12 and a wall of the side of the second annular groove 18, may be painted depending upon the condition. Conversely, from the annular projection 12 to the tip portion 13 of the metal pipe 10 need not be painted.

In a connecting operation of the metal pipe 10 and the flexible tube 30, the tip portion 13 of the metal pipe 10 is placed in line with the mouth of the flexible tube 30, and the metal pipe 10 is gradually inserted into the flexible tube 30. Due to this, the end portion of the flexible tube 30 is expanded by the first tapered surface 21, and passes over the seal ring 16 and the annular projection 12, to reach the second annular groove 18. The metal pipe 10 is then further inserted into the flexible tube 30, and this connecting operation is completed when the tip portion 31 reaches the position slightly over the peak 24 of the second tapered surface 22, i.e., by 0.5-5.0 mm.

In this connecting operation, the metal pipe 10 may be inserted into the flexible tube 30 while an outer surface 19, which is the base side of the metal pipe 10 relative to the second radially enlarged portion 17, is fixed by a jig and so on. Thus, since the jig is engaged with the second radially enlarged portion 17, the metal pipe 10 can be strongly pressed, so that the connecting operation is easy.

In a state in which the flexible tube 30 is connected to the metal pipe 10, the tip portion 31 of the flexible tube 30 is positioned slightly over the peak 24 of the second tapered surface 17, and positioned on an edge of the third tapered surface 23. Therefore, the tip portion 31 of the flexible tube 30 is expanded by the second radially enlarged portion 17, so that a tension force greater than that in the other portions is generated in the tip portion 31. That is, the tip portion 31 is in tight contact with the second radially enlarged portion 17 in a liquid-proof manner, so that water, dust, and so on is prevented from entering between the metal pipe 10 and the flexible tube 30, decreasing the possibility of material causing rust to accumulate. Therefore, the metal pipe 10 hardly rusts, and a surface area in the end portion of the metal pipe 10, which should be painted for rust-prevention, can be reduced.

Figure 3:
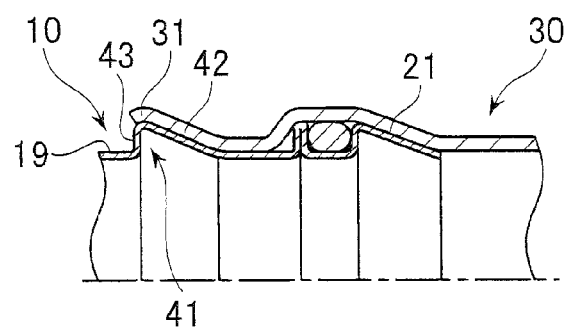
FIG. 3 is a cutaway side view showing an upper-half section of a connection-structure of a flexible tube of a second embodiment.

FIG. 3 shows a second embodiment.

The difference from the first embodiment is a shape of the second radially enlarged portion 41. The inclination angle of the second tapered surface 42 of the second radially enlarged portion 41 and the inclination angle of the first tapered surface 21 are substantially the same. Further, the second radially enlarged portion 41 has a vertical surface 43, positioned on the opposite side of the second tapered surface 42, and the vertical surface 43 is substantially perpendicular to the outer surface of the metal pipe 10. The tip portion 31 of the flexible tube 30 passes over the second tapered surface 42, and reaches the upper edge of the vertical surface 43. The other structures are identical to the first embodiment.

According to the second embodiment, similar effects as the first embodiment can be obtained. In addition to these effects, due to the vertical surface 43 of the second radially enlarged portion 41, a jig becomes easily engaged with the second radially enlarged portion 41 of the metal pipe 10 in a connecting operation of the metal pipe 10 and the flexible tube 30, and thus a pressing operation of the metal pipe 10 becomes easier than the first embodiment.

Figure 4:
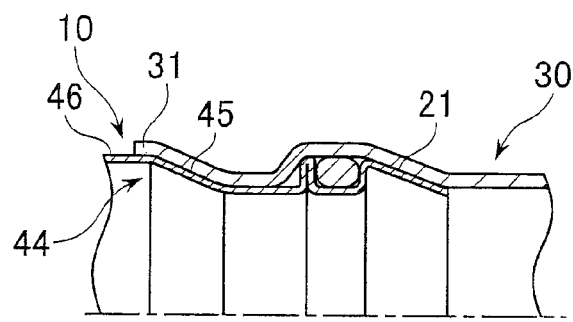
FIG. 4 is a cutaway side view showing an upper-half section of a connection-structure of a flexible tube of a third embodiment.

FIG. 4 shows a third embodiment.

The differences from the first and second embodiments are a second radially enlarged portion 44 and an outer surface of the metal pipe 10. A second tapered surface 45 of the second radially enlarged portion 44 has the same inclination angle as the first tapered surface 21, similarly to the second embodiment. Conversely, an outer surface 46 of the second radially enlarged portion 44, opposite to the second tapered surface 45, is a cylindrical surface having substantially the same diameter as the maximum diameter of the second radially enlarged portion 44. The tip portion 31 of the flexible tube 30 passes over the second tapered surface 45, and reaches an edge of the outer surface 46. The other structures are identical to the first and second embodiments.

In the third embodiment, since the diameter of the base portion of the metal pipe 10 with respect to the second radially enlarged portion 44 is the same as the maximum diameter of the second radially enlarged portion 44, the diameter of the tip portion 31 of the flexible tube 30 cannot be reduced in a state in which the tip portion 31 of the flexible tube 30 is positioned over the second radially enlarged portion 44. Therefore, a gap cannot open up between the tip portion 31 of the flexible tube 30 and the metal pipe 10.

Figure 5:
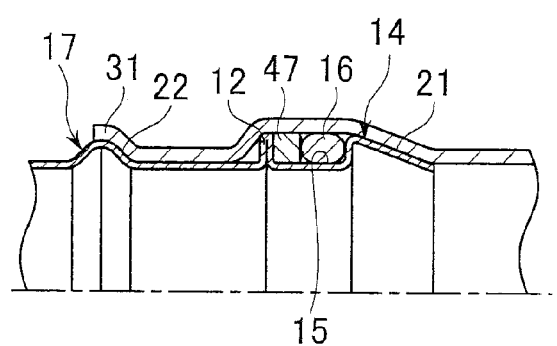
FIG. 5 is a cutaway side view showing an upper-half section of a connection-structure of a flexible tube of a fourth embodiment.

FIG. 5 shows a fourth embodiment.

The fourth embodiment has a similar structure as the first embodiment. The point different from the first embodiment is that the seal ring 16 and a back-ring 47 are fitted into the first annular groove 15. The back-ring 47 is in contact with the annular projection 12, and the seal ring 16 is in contact with a side surface of the first radially enlarged portion 14. The other structures are identical to the first embodiment, and the effect and operation are identical to the first embodiment.

Figure 6:
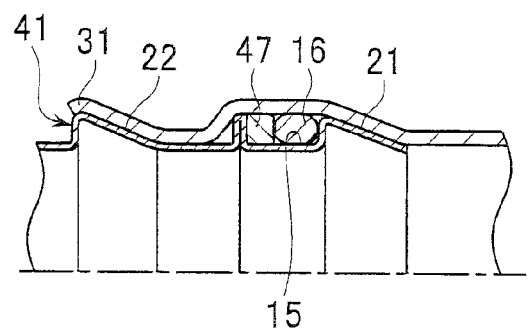
FIG. 6 is a cutaway side view showing an upper-half section of a connection-structure of a flexible tube of a fifth embodiment.

FIG. 6 shows a fifth embodiment.

The fifth embodiment has a structure that resembles the second embodiment. The point different from the second embodiment is that the seal ring 16 and the back-ring 47 are fitted into the first annular groove 15. The other structures are identical to the second embodiment, and the effect and operation are identical to the second embodiment.

Figure 7:
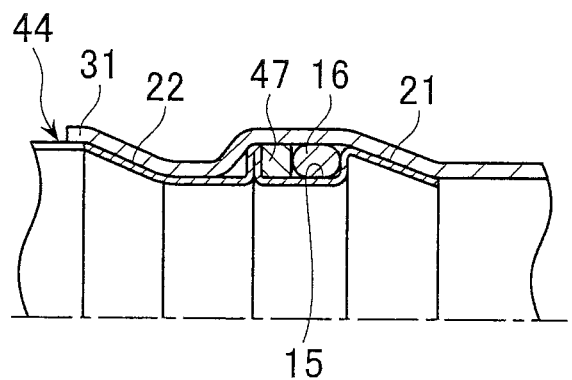
FIG. 7 is a cutaway side view showing an upper-half section of a connection-structure of a flexible tube of a sixth embodiment.

FIG. 7 shows a sixth embodiment.

The sixth embodiment has a structure that resembles the third embodiment. The point different from the third embodiment is that the seal ring 16 and the back-ring 47 are fitted into the first annular groove 15. The other structures are identical to the third embodiment, and the effect and operation are identical to the third embodiment.

Figure 8:
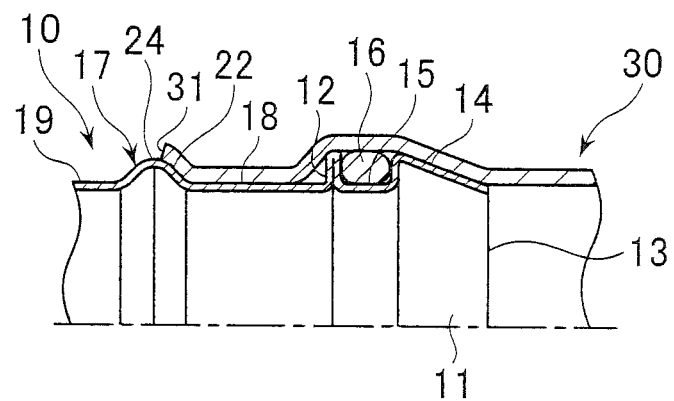
FIG. 8 is a cutaway side view showing an upper-half section of a connection-structure of a flexible tube of a seventh embodiment.

FIG. 8 shows a seventh embodiment.

The basic structure of the seventh embodiment is the same as that of the first embodiment, but the position of the tip portion 31 of the flexible tube 30 is different. That is, although the position of the tip portion 31 of the flexible tube 30 is close to the maximum diameter portion of the second tapered surface 22, the tip portion 31 does not reach the peak 24 of the second radially enlarged portion 17, but is positioned on the second tapered surface 22. The tightness of fit between the flexible tube 30 and the metal pipe 10 is inferior to the first embodiment, but superior to a conventional structure. Thus, water or dust are prevented from entering between the flexible tube 30 and the metal pipe 10.

The present disclosure relates to subject matter contained in Japanese Patent Application No. 2011-038414 (filed on Feb. 24, 2011) which is expressly incorporated herein, by reference, in its entirety.

The invention claimed is:

1. A connection-structure of a flexible tube, in which said flexible tube is tightly fitted to an outer surface of an end portion of a metal pipe, comprising:
   an annular projection that is formed on said outer surface of said end portion of said metal pipe, said annular projection circumferentially extending over a whole circumference of said metal pipe;
   a first radially enlarged portion that is formed on a tip side of said metal pipe relative to said annular projection, said first radially enlarged portion defining a first annular groove with said annular projection;
   a seal ring that is fitted into said first annular groove; and
   a second radially enlarged portion that is formed on a base side of said metal pipe relative to said annular projection, said second radially enlarged portion defining a second annular groove with said annular projection;
   a tip portion of said flexible tube being positioned on said second radially enlarged portion and close to a maximum diameter portion of said second radially enlarged portion.

2. The connection-structure of a flexible tube according to claim 1, wherein said first radially enlarged portion has a first tapered surface on which a diameter of an outer surface of said metal pipe becomes smaller as a distance to a tip portion of said metal pipe decreases, said second radially enlarged portion has a second tapered surface on which a diameter of said outer surface of said metal pipe becomes smaller as a distance to said second annular groove decreases, and the tip portion of said flexible tube is positioned over said second tapered surface.

3. The connection-structure of a flexible tube according to claim 2, wherein a diameter of said outer surface of said metal pipe on an opposite side of said second annular groove with respect to said second radially enlarged portion is substantially the same as a diameter of said outer surface of said metal pipe on said second annular groove.

4. The connection-structure of a flexible tube according to claim 2, wherein said second radially enlarged portion has a third tapered surface that is inclined in an opposite direction of said second tapered surface, said third tapered surface being configured on an opposite side of said second tapered surface.

5. The connection-structure of a flexible tube according to claim 2, wherein said second radially enlarged portion has a vertical surface that is substantially perpendicular to the outer surface of said metal pipe, said vertical surface being configured on an opposite side of said second tapered surface.

6. The connection-structure of a flexible tube according to claim 2, wherein a surface of said second radially enlarged portion, opposite to said second tapered surface, is a cylindrical surface having substantially the same diameter as the maximum diameter portion of said second radially enlarged portion.

7. The connection-structure of a flexible tube according to claim 2, wherein an inclination angle of said first tapered surface and an inclination angle of said second tapered surface are substantially the same.

8. The connection-structure of a flexible tube according to claim 1, wherein said first radially enlarged portion has a first tapered surface on which a diameter of an outer surface of said metal pipe becomes smaller as a distance to a tip portion of said metal pipe decreases, said second radially enlarged portion has a second tapered surface on which a diameter of said outer surface of said metal pipe becomes smaller as a distance to said second annular groove decreases, and the tip portion of said flexible tube is positioned on said second tapered surface.

9. The connection-structure of a flexible tube according to claim 1, wherein a portion of said outer surface of said metal pipe is painted up to said second annular groove, to which the tip portion of said flexible tube is fitted tightly, and a portion of said outer surface from said annular projection to the tip portion of said metal pipe is not painted.

10. The connection-structure of a flexible tube according to claim 1, wherein said metal pipe is utilized in a fuel filler pipe for an automobile.

* * * * *